United States Patent [19]

Fantone

[11] Patent Number: 4,540,246

[45] Date of Patent: Sep. 10, 1985

[54] HOLOGRAPHIC OPTICAL APPARATUS FOR USE WITH EXPANDED-BEAM TYPE FIBER OPTICAL COMPONENTS

[75] Inventor: Stephen D. Fantone, Saugus, Mass.

[73] Assignee: Polaroid Corporation, Cambridge, Mass.

[21] Appl. No.: 479,488

[22] Filed: Mar. 28, 1983

[51] Int. Cl.³ ............................ G02B 5/14; G02B 5/32
[52] U.S. Cl. .................................. 350/3.70; 350/96.19
[58] Field of Search ..................... 350/3.72, 3.73, 3.6, 350/96.18, 96.19, 96.15, 3.7, 3.75, 164, 166

[56] References Cited

U.S. PATENT DOCUMENTS

| | | | |
|---|---|---|---|
| 3,497,283 | 2/1970 | Law | 350/408 |
| 3,622,220 | 11/1971 | Kogelnik | 350/3.5 |
| 4,057,319 | 11/1977 | Ash et al. | 350/96 C |
| 4,359,259 | 11/1982 | Horner et al. | 350/3.7 |
| 4,387,955 | 6/1983 | Ludman et al. | 350/96.19 |
| 4,398,792 | 8/1983 | Horner et al. | 350/96.19 |

FOREIGN PATENT DOCUMENTS

| | | | |
|---|---|---|---|
| 0067972 | 6/1981 | European Pat. Off. | |
| 2059621 | 4/1981 | United Kingdom | 350/96.19 |
| 2098353 | 11/1982 | United Kingdom | 350/96.19 |

OTHER PUBLICATIONS

Sincerbox, "Formation of Optical Elements by Holography," IBM Technical Disclosure Bulletin, Aug. 1967.

Primary Examiner—Bruce Y. Arnold
Assistant Examiner—Bruce S. Shapiro
Attorney, Agent, or Firm—Francis J. Caufield

[57] ABSTRACT

Apparatus for optically coupling a plurality of optical fibers in predetermined combinations. Each optical fiber fits into and is supported by an expanded-beam type optical component that is optically structured to collimate, or nearly collimate, the output from an optical fiber when the fiber is located at, or nearly at, the focus of the optical component. The optical components fit into a housing that is adapted to receive and support them such that at least one of the components is nominally aimed in a first direction and the other optical components are nominally aimed in a direction different from the first direction. The housing includes optical means, including a holographic layer or layers, of predetermined size positioned within the housing to intercept the output from the optical component aimed in the first general direction and precisely direct it into predetermined ones of the other optical components aimed generally differently thereto and to precisely direct the output from any of the similarly aimed optical components into the end of the fiber located in the optical component aimed in the first direction. The apparatus permits the tolerances related to the angular tilt of the lens surfaces of such optical components to be greatly relaxed compared to what they would otherwise need to be to have the same throughput from fiber to fiber when used without the apparatus of the invention.

7 Claims, 10 Drawing Figures

HOLOGRAPHIC OPTICAL APPARATUS FOR USE WITH EXPANDED-BEAM TYPE FIBER OPTICAL COMPONENTS

BACKGROUND OF THE INVENTION

This invention in general relates to devices by which optical fibers can be optically coupled one to another and more particularly to apparatus by which expanded-beam type connectors can be fabricated and used with relaxed tolerances compared to what the tolerances would otherwise have to be to achieve similar throughput between fibers.

As is well-known, fiber optical links have the same basic elements found in electrical communication systems. Electrical signals are converted into light signals which are transmitted through optical fibers to a receiver where light signals are converted back to electrical ones from which information is derived. In the link, connectors serve to assure that tight physical or optical contact is made and maintained between the optical fibers and the transmitting or receiving components of the system.

Although seemingly simple, making connections between the components of a fiber optic link in which optical fibers of hairlike dimensions are employed is extremely troublesome and very different from making an electrical connection which requires only a reliable physical contact between two conductors. For example, a proper connection between optical fibers requires that the ends of the fibers be accurately angularly, laterally, and longitudinally aligned to assure that light leaves and enters them within a certain range of angles. If not, leakage occurs causing large signal losses which make an otherwise attractive communication link impractical. To solve the connector problem with tolerable losses, those skilled in the art have developed a class of connectors referred to as expanded-beam or imaging type connectors which are of the sort described in, for example, U.S. Pat. Nos. 4,183,618 and 4,186,995 and in an article entitled, "Connectors that stretch" appearing in the October 1980 issue of *Optical Spectra*.

The essence of the expanded-beam type connector is to enlarge and collimate or roughly collimate the light beam which emerges from the input fiber or fibers which are accurately placed in one half of the connector at or nearly at the focus of its lens. The other half of the connector, similar in design to the first half but which may in fact be scaled to be larger, then acts optically in reverse to the first connector half by accepting the expanded beam from the first connector half and focusing it into the output fiber end located at or nearly at the axial focus of the other connector half. In this manner, the task of optical alignment becomes one of mechanically aligning relatively large beam cross sections rather than small fiber ends as is done in strictly mechanical or butt-type connectors. With such connectors, however, the burden on optical performance and related mechanical geometry is great and must be maintained to a high degree of precision integrated into the connector to assure that the connector itself does not create high losses. For example, the permissible angular tilt between the lens surfaces of such connectors must be maintained to tolerances on the order of tenths of a degree if losses are not to exceed 0.5 db.

This invention has for one of its objects the provision of apparatus by which the tolerances for such expanded-beam type connectors can be relaxed, particularly the angular tilt of their refracting surfaces, through the use of holographic optical elements.

Those skilled in the art have made use of holographic techniques and holographic optical elements in fiber optic environments as is evidenced by the multiplexer described in U.S. Pat. No. 4,359,259. Thus, it is known that the properties of holographic optical elements can be exploited in a useful way to solve some of the problems associated with fiber optic communication systems.

Holographic optical elements differ from conventional ones because they operate by diffraction rather than by refraction, as in the case of lenses and reflection as with mirrors. They are like diffraction gratings in that they deflect light of different wavelengths at different angles but are free from the limitations of gratings because they can focus, defocus and collimate light as well, i.e., they have lens-like properties.

Another useful property of holograms, both transmissive and reflective, is that subsequent illumination by one of the wave fronts used in constructing them results in the reconstruction of the other wave front.

Although these properties and characteristics are known, they have by no means been fully exploited in applications involving optical fiber systems. Consequently, it is another object of the present invention to provide a holographic optical element for use in optically coupling a plurality of optical fibers in various predetermined combinations.

It is another object of the present invention to provide optical apparatus for coupling a plurality of optical fibers in predetermined ways.

It is another object of the present invention to provide a multiplexer/demultiplexer for use with a plurality of optical fibers.

It is yet another object of the present invention to provide a method by which optical coupling components for use with optical fibers can be fabricated.

It is still another object of the present invention to provide holographic optical elements for use in conjunction with expanded-beam type optical connectors in such a way that the fabrication tolerances heretofore required in fabricating such connectors can be relaxed.

Other objects of the invention will, in part, be obvious and will, in part, appear hereinafter. The invention, accordingly, comprises the apparatus possessing the construction, combination of elements, and arrangement of parts, and the methods, which are exemplified in the following detailed disclosure.

SUMMARY OF THE INVENTION

This invention in general relates to devices by which optical fibers can be optically coupled to one to another and more particularly to apparatus employing holographic optical elements for use in conjunction with expanded-beam type connectors in such a way that the tolerances to which such connectors have heretofore had to be fabricated can be relaxed.

The apparatus of the invention is useful for optically coupling a plurality of optical fibers to one another in predetermined combinations and may also be employed for purposes of multiplexing and demultiplexing signals between various fiber combinations. The apparatus comprises a plurality of optical components each of which includes a refracting surface having a focus at a predetermined location behind the refracting surface and which is additionally adapted to facilitate receiving and positioning the end of an optical fiber at, or nearly at, the focus. The refracting surface of each optical component is configured and arranged so that light emerging from an optical fiber located at the focus of the component is collimated and aimed by the refracting surface within predetermined angular tolerances on emerging therefrom and so that collimated light within the numerical aperture of the optical component, striking its refractive surface, is nominally focused thereby into the end of an optical fiber located at the focus of the component.

Also included is a housing that is adapted to receive and support the optical components such that at least one of the optical components is nominally aimed in a first direction and the other of the optical components are nominally aimed in a direction that is different from that of the first direction.

Holographic means, preferably a holographic layer or layers, of predetermined size are positioned within the housing to intercept the output from the optical component aimed in the first direction and precisely direct it into predetermined ones of the other optical components aimed differently from the first direction and to precisely direct the output from any of the similarly aimed optical components into the end of the optical component aimed in the first direction.

The holographic layer has interferometrically formed therein index of refraction variations which operate to correct any aiming errors between the optical fibers whose outputs have been selected to be coupled to one another and which are the result of either variations in the characteristics of the optical components themselves, the manner in which the optical fibers have been placed or inserted into the optical components, and also variations in the manner in which the optical components are aimed as a result of variations in the geometric tolerances between the optical components and the housing.

The invention can be practiced to provide simple coupling between only a pair of optical fibers or coupling between three or more optical fibers, or it can be used to multiplex and demultiplex signals between a plurality of optical fibers on the basis of preassigned wavelengths associated with selected combinations of fibers.

Methods inherent in the use of the apparatus also form part of the invention.

DESCRIPTION OF THE DRAWINGS

The novel features that are considered characteristic of this invention are set forth with particularity in the appended claims. The invention itself, however, both as to its organization and method of operation, together with other objects and advantages thereof will be best understood from the following detailed description of the illustrated embodiments when read in connection with the accompanying drawings wherein like numbers have been employed in the different figures to denote the same parts and wherein:

DETAILED DESCRIPTION OF THE PREFERRED EMBODIMENT

This invention in general relates to apparatus by which two or more optical fibers can be optically connected in predetermined ways and in particular to apparatus employing a holographic element for use in conjunction with a well-known expanded-beam type connector in such a way that the fabrication tolerances heretofore required for making such connectors can be relaxed and, as well, so that tolerances associated with the use of such connectors for coupling purposes are rendered less demanding. To understand the nature of the features of the apparatus of the invention and its method of use, it will first be necessary to become familiar in some detail with the general characteristics of expanded-beam type connectors.

Figure 1:
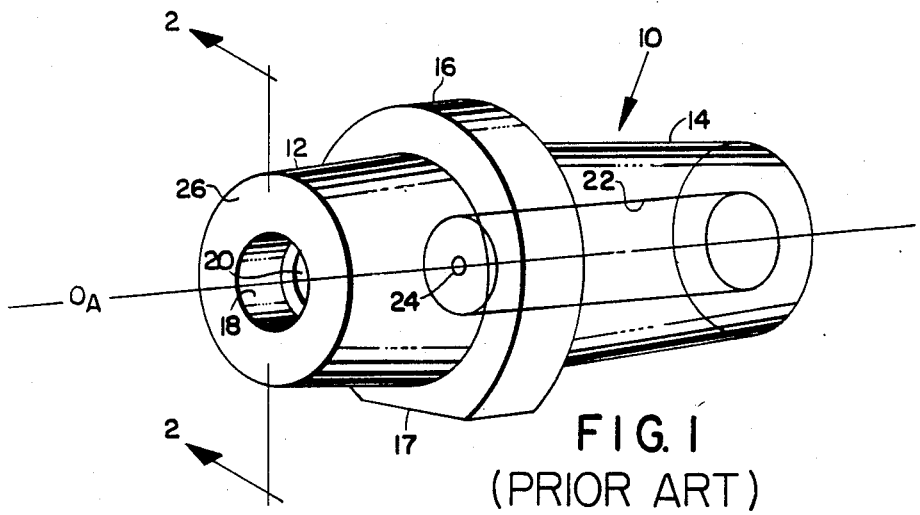
FIG. 1 is a diagrammatic perspective view of a well-know expanded-beam type lens structure or optical component useful in connecting optical fibers.
Figure 2:
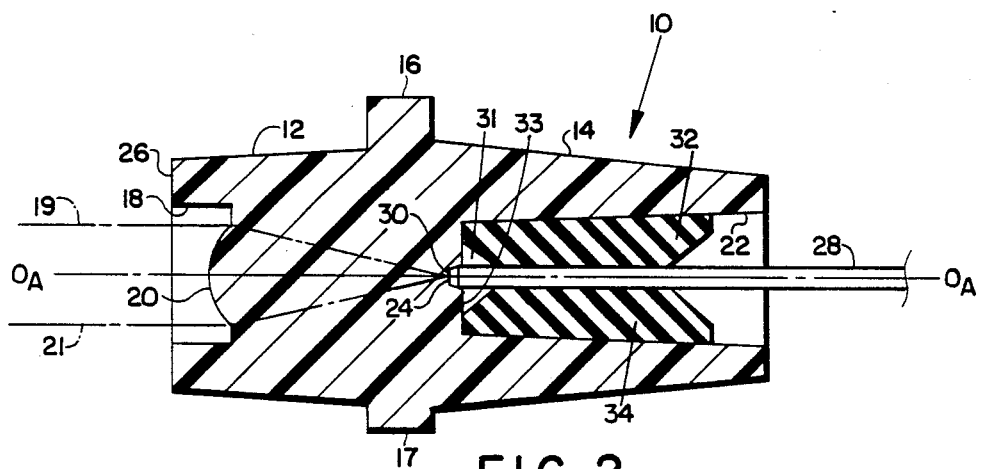
FIG. 2 is a slightly enlarged cross-sectional view of the optical component of FIG. 1, taken generally along line 2—2 in FIG. 1, and shown in combination with a segment of an optical fiber and holder arrangement therefor.

For these purposes, reference is now made to FIG. 1 which shows, designated at 10, a lens structure or optical component which is of the beam expansion type and which includes the features representative of this class of optical component. The optical component 10, as can be seen in FIGS. 1 and 2, is an integrally formed structure, preferably molded of optical quality plastic. The optical component 10 comprises a front tapered section 12 and a rear tapered section 14 which join at a flange 16 having a flat surface 17 located in its circumferential surface. In the front section 12, there is a cylindrical bore 18 having a base in the form of an aspheric lens surface 20. In the rear tapered section 14, there is a tapered bore 22 having a base 33 which includes a tapered indent 24 located at its center. The taper of the bore 22 is shown in exaggerated fashion for clarity.

The tapered bore 22 is structured to receive three molded elastic fiber holders (only two shown) such as those designated at 32 and 34. The elastic fiber holders, 32 and 34, are injection molded from an elastomeric polymer and each has a triangular shaped cross section which longitudinally tapers and is especially configured so that, when three of the fiber holders are inserted into the tapered bore 22, they form between them, along the central axis of the bore 22, a small hole that tapers out at each end of the fiber holders, 32 and 34. The size of this hole is by design made to be slightly too small to accept an optical fiber without stretching.

Between the tapered bore base 33, containing the tapered indent 24, and the forward ends of the fiber holders, e.g., 32 and 34, there is formed a small cavity 31. An epoxy having the same index of refraction, or nearly so, as that of the plastic from which the optical component 10 is formed is placed into this cavity 31 via the hole formed between the fiber holders, 32 and 34. Afterwards, an optical fiber such as that designated at 28 is inserted into the hole formed between the fiber holders, 32 and 34, until the end thereof, designated at 30, seats in the taper of the indent 24. Since the hole formed between the fiber holders, 32 and 34, is intentionally smaller than the outside diameter of the fiber 28, the walls of the fiber holders (32 and 34) are stretched by the optical fiber 28 and each exerts on the optical fiber 28 lateral restoring forces which are proportional to the amount of deformation experienced by the optical fiber holders, 32 and 34. These forces balance against one another to center the optical fiber 28 along the optical axis, OA, of the optical component 10 because an elastomeric material under pressure behaves like fluid to uniformly distribute any forces exerted upon it. The longitudinal position of the optical fiber end 30, along the optical component optical axis, OA, is determined by the diameter of the bare fiber in combination with the geometry of the tapered sides of the indent 24.

The dimensions of the tapered indent 24 are chosen so that the forward progress of the optical fiber end 30 is terminated by interfering with the walls of the indent 24 at the axial focus of the aspheric lens surface 20 whose shape is chosen to correct for spherical aberrations on-axis. The presence of the epoxy, whose index matches that of the material from which the optical component 10 is fabricated, in the cavity 31 reduces unwanted reflections at the optical fiber end 30, and any light traveling from the lens surface 20 to the optical fiber end 30 experiences no additional refraction in traveling toward the optical fiber end 30 since the index of refraction everywhere along its path of travel is uniform, or nearly so. Thus, a pair of parallel rays, such as those designated at 19 and 21, impinging upon the aspheric surface 20 are focused thereby into the optical fiber end 30, as best shown in FIG. 2. Conversely, any light emerging from the optical fiber end 30 diverges after which it is collimated by the aspheric lens surface 20 and emerges therefrom as a parallel bundle. Another way of stating this is that the numerical aperture of a bundle of rays emerging from the optical fiber end 30 is reduced upon emergence from the aspheric lens surface 20.

Figure 3:
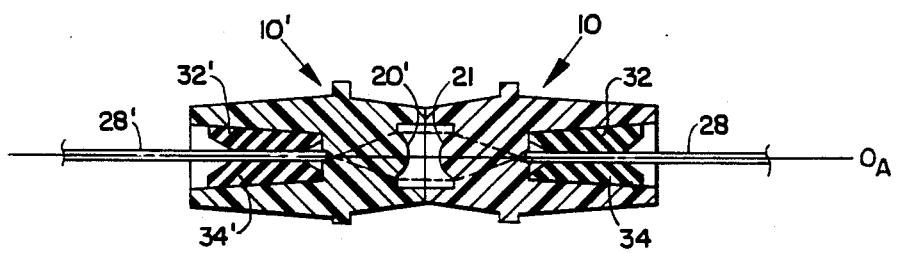
FIG. 3 is a cross-sectional view similar to that of FIG. 2, but with reduced scale, showing a pair of optical components of the type illustrated in FIG. 2 butted against one another to form a fiber optic connection.

Surrounding the optical component front section bore 18 is an annular flat reference surface 26 that is nominally perpendicular to the optical axis, OA, of the optical component 10. The permissible angular tilt of this reference surface 26 with respect to the optical axis is on the order of plus or minus 30 arc seconds. When a pair of optical components of this type are butted together against their annular reference surfaces with their aspheric lens surfaces facing one another (shown in FIG. 3 where the optical components are identical but are differentiated with primed numerals), the beam of light emerging from one fiber end 28', serving as input gradually diverges as shown, for example, in the lens structure 10' after which it is collimated or nearly collimated by the aspheric lens surface 20' thereof and is then received by the other half of the connector pair and is focused by its lens surface 20 into the end of the optical fiber 28 located in that half of the connector. The lateral alignment between the optical axes of such a pair of connectors or components may be accomplished in a well-known manner by utilizing their exterior surfaces as lateral alignment reference surfaces because of their general rotational symmetry.

The optical fibers used with these types of optical components may be multimode or single mode which are capable of carrying information signals in the form of one or more modulated electromagnetic waves of preselected wavelength. Typically, a laser or laser diode is used as a source because of the coherence properties of such sources.

Although other optical components of this general type may have slightly different features than the one presently illustrated, all such optical components operate in generally the same manner. That is, the output from one optical fiber end is collimated, or nearly collimated, by a lens surface thereof after which this beam is received by a mating optical component or mating lens structure and is focused thereby into the end of another optical fiber end to complete the connection of the two optical fibers. Reference surfaces are generally included in each lens structure or optical component so that they may be properly aligned longitudinally, laterally, and perpendicular to one another.

Figure 4:
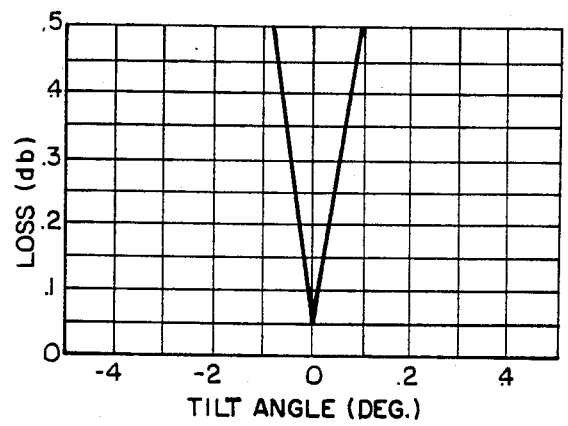
FIG. 4 is a graph indicating the variation in loss, expressed in dbs, with variations in the angular tilt between the lens surfaces of the arrangement illustrated in FIG. 3.

These kind of lens structures have several advantages. The optical fibers are completely protected within the connection and any dust or scratches on the lens surfaces have far less of an affect on the large diameter beam than if they were on the fiber end surfaces themselves. Additionally, the highly enlarged beam diameter makes the lateral tolerances for the interface between two connectors easy to maintain. Moreover, the collimated nature of the beam gives enough separation between the connectors to allow for the insertion of other optical elements in the intervening space. However, not all of the tolerances are loose in this kind of design. For example, the optical fibers must be positioned relative to their respective lenses to the same sorts of accuracy that one would expect to have to achieve in butt-coupling the optical fibers themselves. And, the permissible angular tilt between their reference surfaces and the optical axis, OA, or between the aspheric lens surfaces and the optical axis, OA, or between combinations of the tilt of the reference surface and the lens surfaces is actually tighter than for butting two fibers together. An example of the types of losses which one can expect to experience with small angles of tilt is illustrated in FIG. 4 wherein it can be seen that a 0.5 db loss is possible with only a tilt angle error of 0.1-degrees or six minutes of arc. Consequently, it will be understood why it is necessary to fabricate such optical components to extremely accurate perpendicularity tolerances on their lens surfaces and reference surfaces. Angular tilt errors translate to aiming errors of the beams of light emerging from their aspheric lens surfaces and these aiming errors ultimately account for the throughput losses such as that illustrated in FIG. 4.

Even though the tighter tolerances demanded are limited to the one-time process of making the mold from which such optical components are fabricated, fabrication is still extremely difficult because of other factors related to the injection molding process. Therefore, there is a need to be able to manufacture such optical components to looser tolerances while still maintaining their other attractive features. The apparatus of the invention, as will subsequently be seen, permits the fabrication of such optical components to tilt tolerances much greater than previously possible without otherwise degrading their performance.

Figure 5:
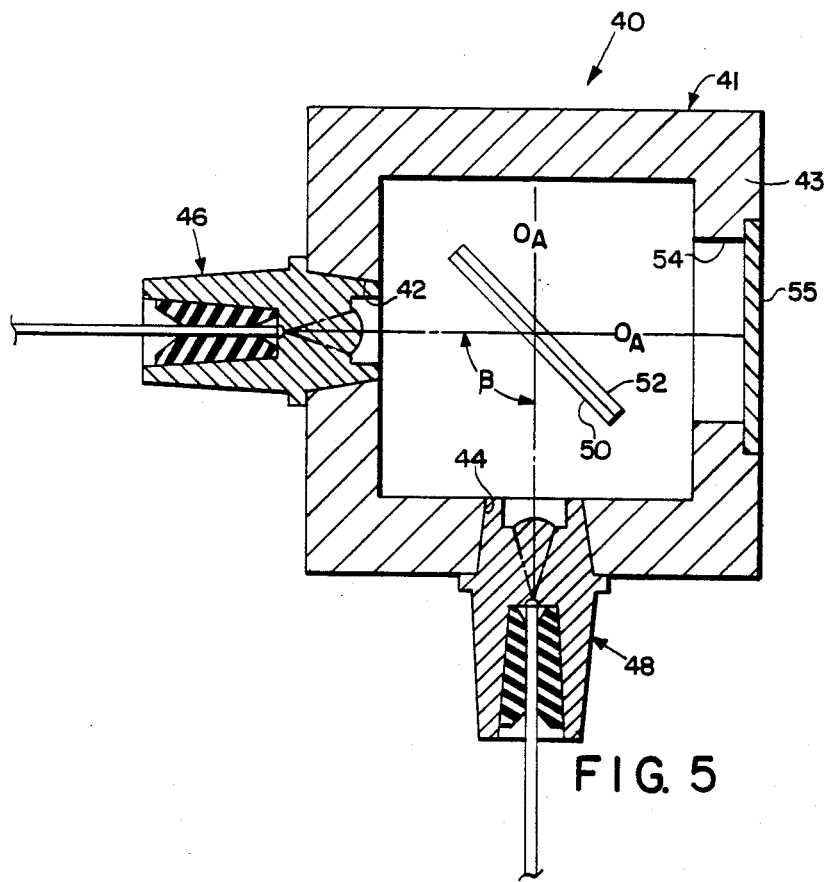
FIG. 5 is a diagrammatic sectional view of the apparatus of the invention.

Referring now to FIG. 5, there is shown at 40 the apparatus of the invention by which two optical fibers located in beam-expansion type optical components having looser tolerances than usual can be optically coupled to one another. The apparatus 40 comprises a housing 41 which is square in cross section and has formed therein in two adjacent orthogonal walls apertures, 42 and 44, respectively which are adapted to receive and support therein optical components, 46 and 48, respectively. An included angle, $\beta$, between the optical axes of the optical components, 46 and 48, is conveniently set to be nominally 90-degrees but can be nominally much greater or less than 90-degrees if required taking into consideration all of the factors which can cause the included angle, $\beta$, to be other than that adopted. These factors would include the perpendicularity between the apertures, 42 and 44, and the optical components, 46 and 48, and any tilt between the reference surfaces or apheric lens surfaces of the optical components, 46 and 48, and their respective optical axes.

A clear substrate 50 is mounted in a conventional manner in the housing 41, nominally at 45-degrees with respect to the walls of the housing 41, and overlying the substrate 50, there is provided a holographic layer or layers 52 which have formed therein index of refraction variations in a manner to be subsequently described. In a wall 43 of the housing 41, facing oppositely to the wall in which the optical component 46 is located, there is provided another aperture 54 centered more or less on the optical axis, OA, of the optical component 46. The aperture 54 is for a purpose which is to be subsequently described and is covered by a removable plate 55.

The apparatus 40 operates in a manner to be subsequently described to more or less perfectly image the output from the optical fiber located in the optical component 46 into the end of the optical fiber located in the optical component 48 even though the included angle between the respective optical axes of the optical components, 46 and 48, is not 90-degrees, i.e., beams emerging from either one are, in spite of any misaiming, exactly focused into the receiving fiber end. The correction required to properly aim the one fiber output into the other is accomplished through the optical action of the holographic layer or layers 52. In this regard, the substrate operates in a conventional way to more or less accurately support the holographic layer 52, and the aiming correction, which is required because of the looser tolerances allowed in fabricating the optical components, 46 and 48, is provided by the holographic layer or layers 52. The reason why the holographic layer 52 operates in the foregoing manner is a consequence of the fact that it is a reflection-type hologram which has the property of, after construction and subsequent illumination by one of the wave fronts used in constructing it, recreating in reconstruction the other wave front. The manner in which this property is exploited for the purposes at hand will best be understood by now taking up the method by which these properties are formed in the holographic layer 52.

The general method for providing the holographic layer 52 with its necessary characteristics is to form therein by an interferometric procedure index of refraction variations that are suitably arranged so that, a reconstruction of the hologram contained in the layer 52 by an output in the form of coherent radiation from either of the fibers located in the optical components, 46 and 48, directs those outputs in a preferred way. To properly form these index variations, which are not shown because of their small size, the material comprising the holographic layer 52 is required to have sufficient sensitivity within the spectral regions in which the apparatus 40 will be used, i.e., it must be a photosensitive medium of suitable speed. Also, the material must be of sufficient thickness, say 10 to 100 micrometers, so as to achieve a high diffraction efficiency and to provide a bandwith of sufficient breadth for proper operation. In addition, the material must have a high resolution in order to record the high density of optical fringes necessary for practical operation. Materials suitable for this purpose are well known and may comprise developable photopolymers, a dichromated gelatin coating, or a photoresist film.

Figure 6:
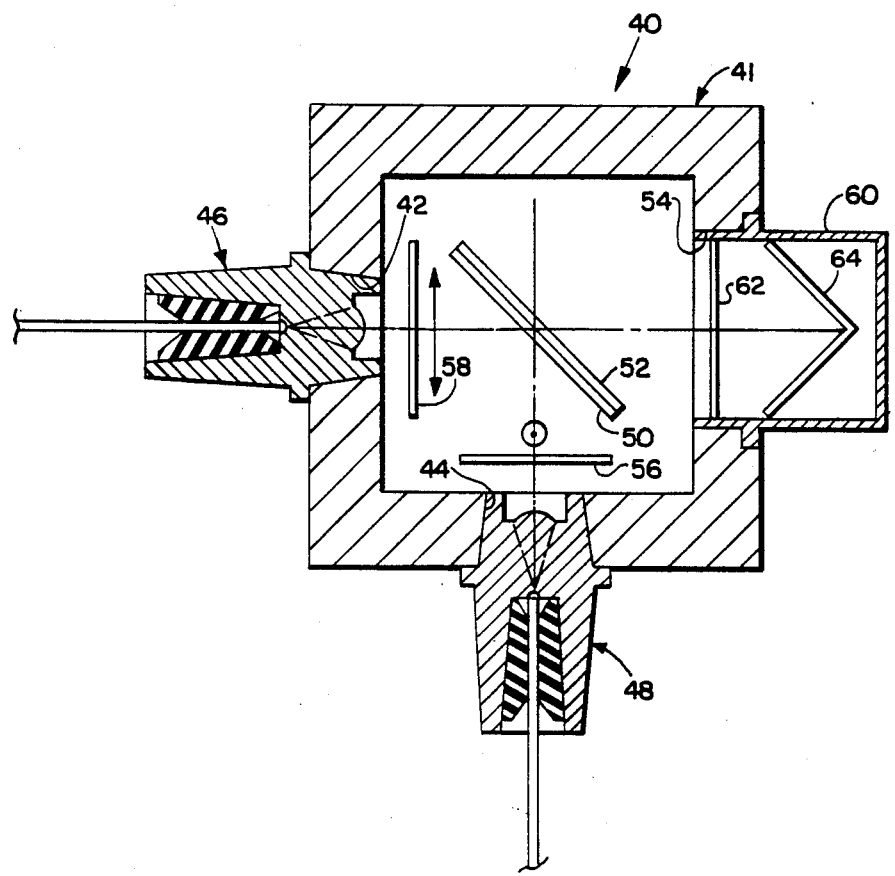
FIG. 6 is a diagrammatic sectional view of the apparatus of the invention shown in combination with other components that are used in a method for forming interference patterns in a holographic layer which forms part of the apparatus illustrated in FIG. 5.

To form the necessary index of refraction variations in the holographic layer 52, the arrangement illustrated in FIG. 6 is used. As seen in FIG. 6, a plane polarizer 56 is provided to intercept coherent radiation emerging from the optical component 48 and plane polarize perpendicular to the plane of the paper as indicated by the circled dot, and a plane polarizer 58 is positioned in front of the optical component 46 to plane polarize radiation emerging from it in a plane parallel to the plane of the paper as indicated by the double-headed arrow. In the aperture 54 is inserted a housing 60 after removing the cover plate 55, and the housing 60 includes a quarter-wave plate 62 and a non-depolarizing retroreflector 64.

Figure 7:
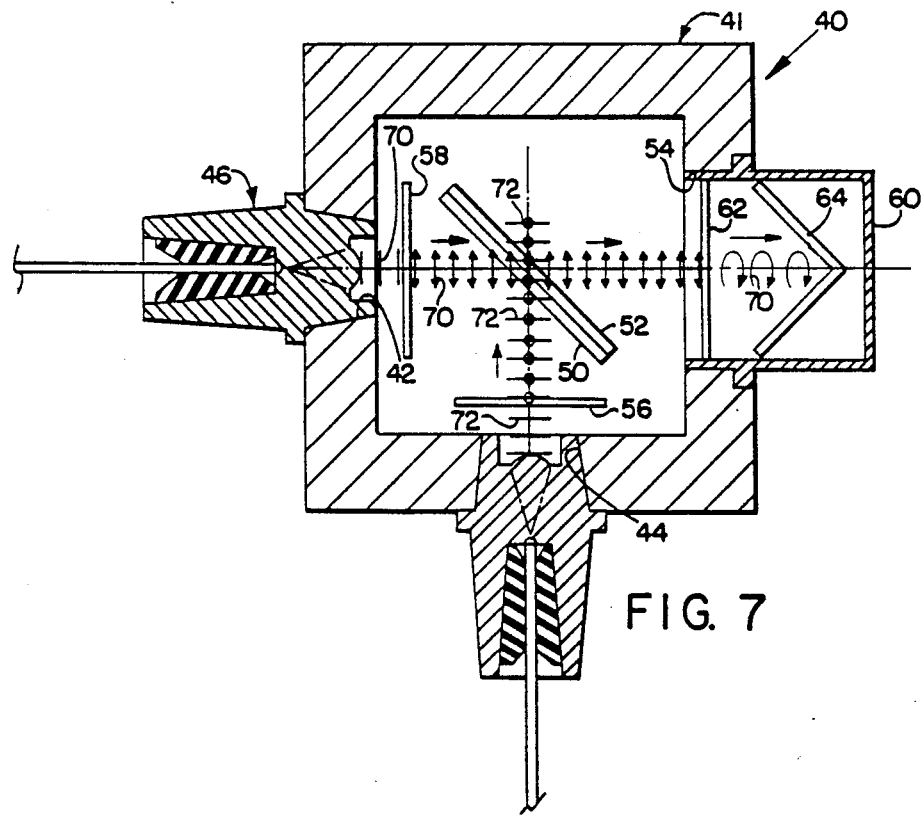
FIG. 7 is similar to FIG. 6 and illustrates, in diagrammatic fashion, the optical action of various components illustrated in FIG. 6 on coherent radiation emerging from a pair of optical fibers.
Figure 8:
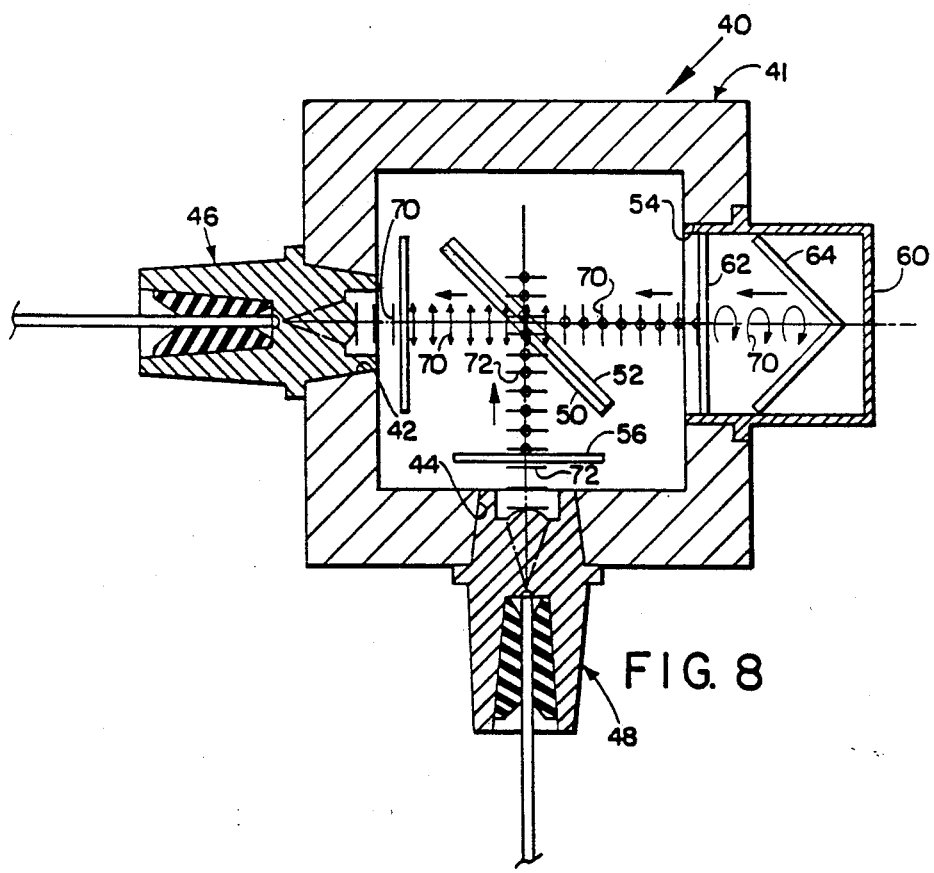
FIG. 8 is similar to FIG. 7 and illustrates further optical action on the coherent radiation shown in FIG. 7.

In FIGS. 7 and 8, there is illustrated the optical action of the substrate 50, and the other various components just described, on coherent radiation emerging from the optical components, 46 and 48, without aiming error. The underlying reason for this arrangement comes from the requirement that the holographic layer 52 must operate as a reflection hologram and therefore needs to be exposed from opposite sides thereof to be exploited for the use here.

As shown in FIG. 7, a coherent wave front 70 emerging from the optical component 46 passes through the plane polarizer 58 and then through the substrate 50 and holographic layer 52 after which it travels in the directions indicated by the arrows towards the quarter-wave plate 62 and the retroreflector 64. At the same time, a coherent wave front 72 emerging from the optical component 48 passes through the plane polarizer 56 and then through the substrate 50 and the holographic layer 52 as indicated by the direction arrow.

As shown in FIG. 8, the wave front 70 is retroreflected from the retroflector 64, having its direction of travel reversed, after which it passes through the quarterwave plate 62 again and emerges therefrom as a beam of coherent radiation which is now polarized in the same plane of polarization as that of the wave front 72 as indicated by the central circles in the wave fronts labeled 70. Therefore, the wave fronts 70 and 72 interfere with one another in the holographic layer 52 in azimuths parallel thereto, since they are now polarized alike, to create a fringe pattern therein representative of any aiming errors between the optical components, 46 and 48.

In this way, the holographic layer 52 is formed by exposure from opposite sides thereof and the period of time for exposure is chosen to preferably give maximum diffraction efficiency while keeping the optical path lengths involved equal so that there is a high degree of coherence between the two exposing beams used during exposure thus resulting in a high modulation of the interference fringes. Also, it is necessary to maintain the state of polarization from the exposing beams to be the same, or nearly so, to maximize diffraction efficiency in the holographic layer 52. However, in the operation of the apparatus 40 maintenance of the state of polarization emerging from the various optical fibers involved is not necessary.

Figure 9:
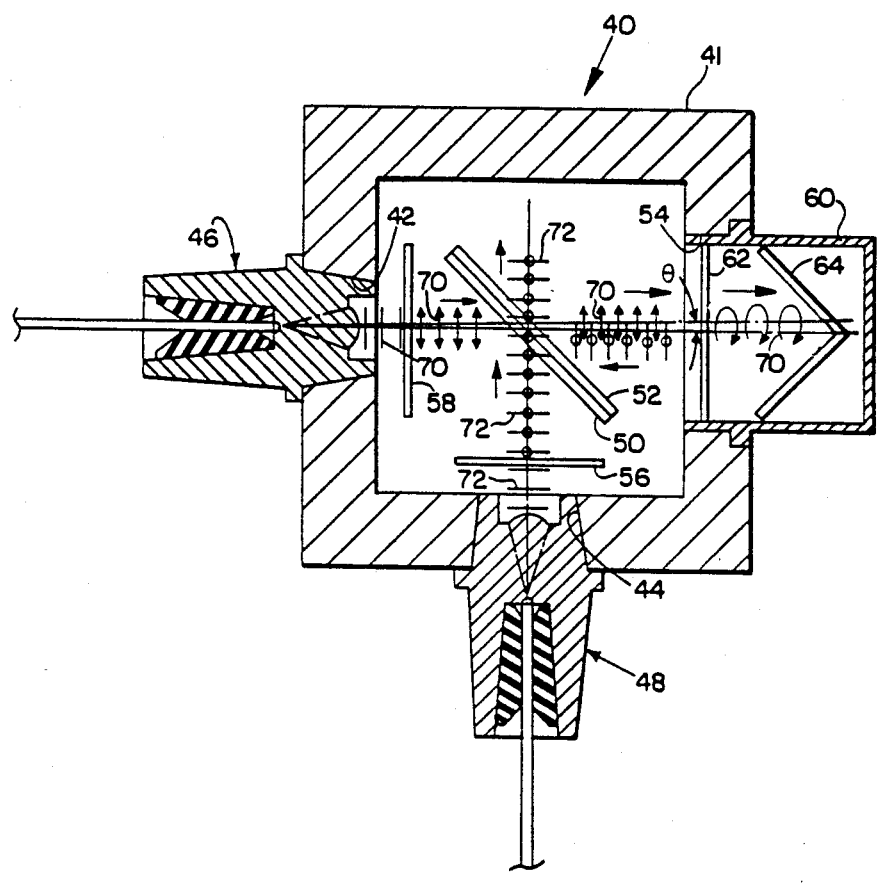
FIG. 9 is similar to FIGS. 7 and 8 and illustrates, in exaggerated fashion, the optical action of the various components illustrated in FIGS. 7 and 8 on coherent radiation emerging from a pair of optical fibers placed in optical components which are greatly misaimed with respect to one another.

FIG. 9 illustrates, in exaggerated fashion, an aiming error indicated by the angle, $\theta$, between the optical components, 46 and 48, and the effect which this aiming error, $\theta$, has on the wave fronts, 70 and 72, emerging respectively from the optical components, 46 and 48.

Here, it can clearly be seen that the retroflected wave front 70 and the wave front 72, both polarized in the same azimuth, interfere with one another in the holographic layer 52 to create an index of refraction variation therein that is related to the aiming errors between the two optical components, 46 and 48. Subsequent reconstruction of the hologram contained in the layer 52 by a coherent source of the same wavelength used in constructing it in the arrangement shown above, and emerging from either the optical component 46 or 48, causes that output to be exactly focused into the end of the receiving fiber since the holographic layer 52 is of the reflection type. If the fibers to be connected are to carry more than one signal, exposure can be made with all of the wavelengths selected for use to create multiple interference patterns one each for each wavelength or information channel selected. Moreover, this may be done with the angle $\beta$ or the substrate 50 at angles other than those illustrated, and it is to be understood that the normal to the substrate 50 need not bisect the included angle, $\beta$.

After exposure of the holographic layer 52 and subsequent processing of it, the polarizers, 56 and 58, are removed and, as well, the housing 60 including the quarterwave plate 62 and the retroflector 64 is removed and the aperture 54 is again covered with its plate 55.

Figure 10:
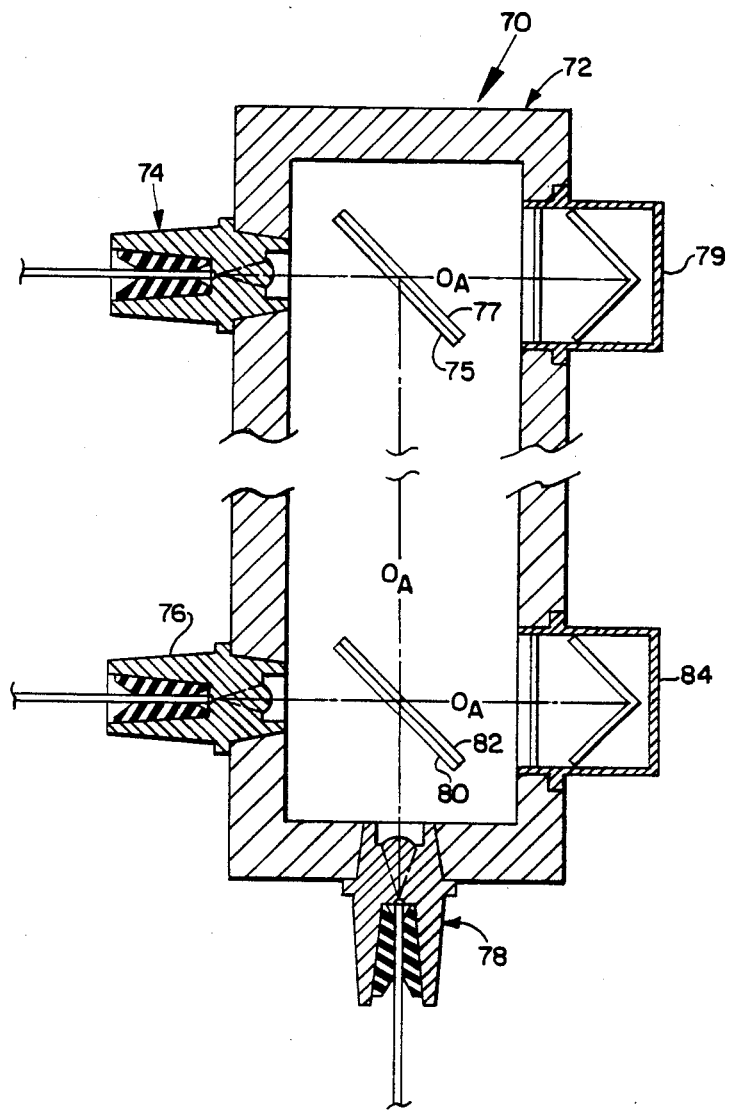
FIG. 10 is a diagrammatic sectional view of an alternate embodiment of the invention which may be used for purposes of multiplexing and demultiplexing signals between a plurality of optical fibers.

If it is desired to practice the invention for purposes of frequency division multiplexing where all of the messages from different sources are combined on carriers of different frequency or wavelength and then simultaneously transmitted along a single transmission medium for separation later on the basis of the preassigned wavelength or frequency associated with each information source, the apparatus illustrated in FIG. 10 and designated at 70 can be employed. The apparatus 70 comprises a housing 72, generally rectangular in cross section, and capable of supporting along one side thereof in the manner previously described a plurality of optical components such as those designated at 74 and 76. In the wall adjacent and orthogonal to the wall supporting the plurality of optical components there is provided in a manner previously described an aperture for receiving and supporting an additional optical component 78 whose optical axis nominally intersects that of the optical components, 74 and 76, at nominally 90-degrees. However, 90-degrees is not necessary and may be made acute to minimize cross talk in which case the substrates employed are angled accordingly. Each of the plurality of optical components, 74 and 76, are intended to carry information in the form of electromagentic waves operating at preselected wavelengths which are different from one another. The optical component 78 is designated as a master component and its associated fiber is capable of carrying a plurality of information channels.

Associated with each of the optical components, 74 and 76, are separate substrates (75 and 80), holographic layers (77 and 82), and retroreflective housing arrangements (79 and 84), respectively. The holographic layers, 77 and 82, are separately exposed in the manner previously described at a preselected wavelength so that upon reconstruction of their respective holograms, each output from these optical components are directed exactly into the optical fiber associated with the optical component 78 and vice versa. Since each holographic layer associated uniquely with each of the plurality of optical components, 74 and 76, is separately exposed, the holographic layers operate in a wave-length selective manner to direct only that wavelength which has been preselected for them and emerging from the optical component 78 into the correct fibers associated with the optical components, 74 and 76. In this manner, the optical component 78, which carries a plurality of channels, has these channels selectively separated out of its signal and each is directed on the basis of a preselected wavelength into the plurality of optical components, 74 and 76, which has been designated to operate at that wavelength. In like manner, each preselected wavelength signal emerging from each of the plurality of optical components, 74 and 76, can be combined into a composite signal to travel along the fiber associated with the optical component 78 for multiplexing purposes.

In practicing either forms of this invention, it is important to space and orient the optical fiber ends so that light emerging from them and striking the holographic layer used, of whatever geometry, overlaps sufficiently to keep the diffraction efficiency of the holographic layer high.

It will be obvious to those skilled in the art that other changes may be made in the above-described embodiments and methods without departing from the scope of the invention. Therefore, it is intended that all matter contained in the above description or shown in the accompanying drawings shall be interpreted as illustrative and not in a limiting sense.

What is claimed is:

1. Apparatus for optically coupling optical fibers, said apparatus comprising:

a plurality of optical components each of which includes a refracting surface having a focus at a predetermined location behind said refracting surface and which is adapted to facilitate receiving and positioning an end of an optical fiber at or nearly at said focus, said refracting surface being optically configured so that light emerging from an optical fiber located at a focus thereof is collimated and aimed by said refracting surface within predetermined angular tolerances on emerging therefrom and so that collimated light within the numerical aperture of said optical components which strikes said refracting surface thereof is nominally focused thereby into the end of an optical fiber;

a housing adapted to receive and support said optical components such that at least one of said optical components is nominally aimed in a first direction and the others of said optical components are nominally aimed in a direction different from that of said first direction; and reflection holographic means of predetermined size positioned within said housing and exposed and developed in place in said housing to operate to intercept an output from said optical component aimed in said first direction and precisely direct it into predetermined ones of said differently aimed other optical components and to precisely direct the output from any of said differently aimed optical components into the end of said optical component aimed in said first direction, said reflection holographic means having interferometrically formed therein index of refraction variations by exposure and development in place to correct for any aiming errors between said components.

2. The apparatus of claim 1 wherein said holographic means comprises at least one holographic layer of predetermined thickness overlying a predetermined portion of a clear substrate.

3. The apparatus of claim 2 wherein said first direction and said different direction are orthogonal and wherein said substrate is planar and is arranged at an angle that is nominally at 45-degrees to both said first direction and said direction orthogonal thereto.

4. Apparatus for optically coupling predetermined combinations of a plurality of optical fibers where each optical fiber can carry information signals on one or more modulated electromagnetic waves of preassigned wavelength, said apparatus comprising:

a plurality of optical components each of which includes a refracting surface having a focus at a predetermined location behind said refracting surface and each of which is adapted to facilitate receiving and positioning an end of an optical fiber at or nearly at said focus, said refracting surfaces being optically configured so that light emerging from an optical fiber located at a focus thereof is collimated and aimed by said refracting surface within a predetermined angular tolerance on emerging therefrom and so that collimated light within the numerical aperture of said optical components which strikes a refracting surface thereof is nominally focused thereby into the end of an optical fiber;

a housing adapted to receive and support said optical components such that at least one of said optical components is nominally aimed in a first direction and the other of said optical components are nominally aimed in a direction different from that of said first direction; and at least one reflection holographic means of predetermined configuration arranged in a predetermined spaced apart relationship with respect to said optical components and exposed and developed in place in said housing to operate to receive any information signal of any preassigned wavelength, from any or all of the optical fibers, said holographic means being structured to, in cooperation with said optical components, selectively and precisely direct predetermined portions of any signals received thereby into the ends of various combinations of the optical fibers in accordance with predesignated wavelengths associated with each combination, said reflection holographic means having interferometrically formed therein index of refraction variations by exposure and development in place to correct for any aiming errors between said components.

5. The apparatus of claim 4 wherein said holographic means comprises at least one holographic layer of predetermined thickness.

6. The apparatus of claim 4 wherein said holographic means comprises at least one holographic layer overlying a predetermined portion of a clear substrate.

7. A method for optically coupling predetermined combinations of a plurality of optical fibers where each optical fiber can carry information signals on one or more modulated electromagnetic waves of preassigned wavelength and is supported in an optical component which includes a refracting surface having a focus at a predetermined location behind the refracting surface and which is adapted to facilitate receiving and positioning an end of an optical fiber at or nearly at the focus and wherein the refracting surface is optically configured so that light emerging from an optical fiber located at a focus thereof is collimated and aimed by such refracting surface within predetermined angular tolerances on emerging therefrom and so that collimated light within the numerical aperture of such optical components which strikes a refracting surface thereof is nominally focused thereby in the end of an optical fiber, said method comprising the steps of:

supporting the optical components with the fibers therein such that at least one of the optical components is nominally aimed in a first direction and the other of the components are nominally aimed in a direction different from that of said first direction;

placing at least one holographic medium of predetermined size in position to intercept radiation emerging from any and all of the optical components; and exposing said holographic medium from different sides thereof with coherent radiation of preselected wavelength from different preselected combinations of the optical components to interferometrically form therein, for each combination, index of refraction variations which, upon subsequent development in place and reconstruction of said developed holographic medium with radiation from any optical component of said combinations, and at a wavelength corresponding thereto, operate to precisely direct such radiation into the end or ends of optical fibers located in the remaining optical components of said combinations.

* * * * *